United States Patent [19]

Roberts, Jr.

[11] 3,952,422
[45] Apr. 27, 1976

[54] PERSISTENCE TEST APPARATUS

[76] Inventor: David B. Roberts, Jr., 211 4th Place, SW., Largo, Fla. 33540

[22] Filed: Nov. 15, 1974

[21] Appl. No.: 524,344

[52] U.S. Cl. ................................................. 35/22 R
[51] Int. Cl.² ...................................... G09B 19/00
[58] Field of Search ........................ 35/22 R; 272/67

[56] References Cited
UNITED STATES PATENTS

| 1,842,165 | 1/1932 | Guhin | 35/22 R X |
| 2,023,488 | 12/1935 | Poppen | 35/22 R X |
| 2,920,418 | 1/1960 | Britt | 272/67 X |
| 3,276,149 | 10/1966 | Barnabas | 35/22 R |
| 3,357,115 | 12/1967 | Kelley | 35/22 R |
| 3,388,630 | 6/1968 | Leitner | 35/22 R X |
| 3,427,731 | 2/1969 | Debolt | 35/22 R X |
| 3,747,589 | 7/1973 | Harrison et al. | 35/22 R X |
| 3,830,493 | 8/1974 | Miller | 272/67 |

Primary Examiner—Wm. H. Grieb
Attorney, Agent, or Firm—Clarence A. O'Brien; Harvey B. Jacobson

[57] ABSTRACT

A mounting and control arrangement is provided for a threaded rod such that a subject spinning a split nut on the threaded rod can be "timed" for successive trial rotations. One series of times are taken with the threaded rod stationary. One or more trial times are taken with the threaded rod being rotated at a speed that requires more concentration and effort on the part of the subject. The various time trials are assimilated to provide a "persistence" rating for the subject.

10 Claims, 6 Drawing Figures

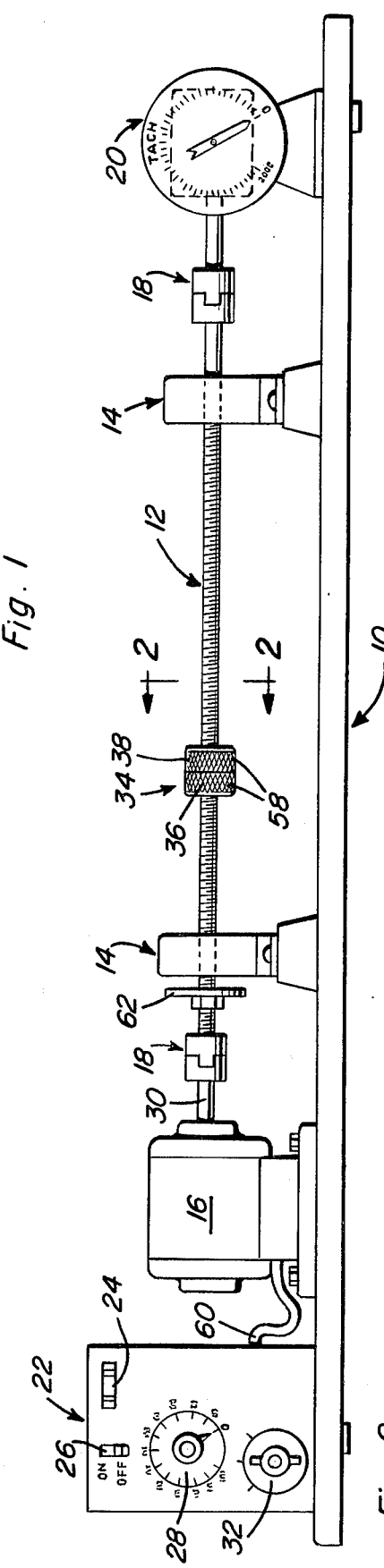
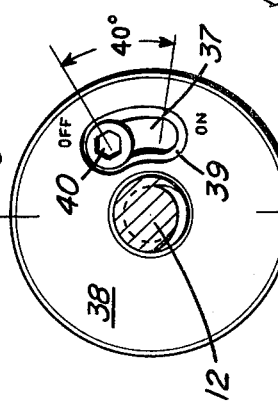
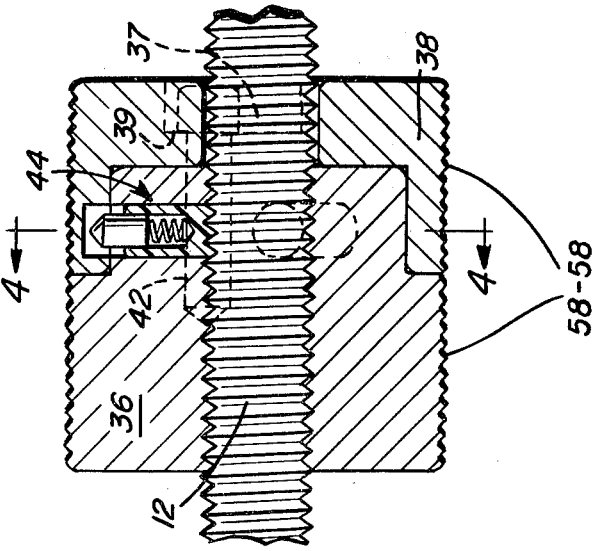
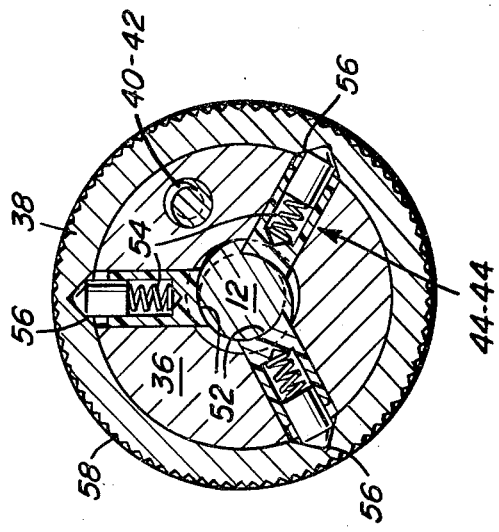
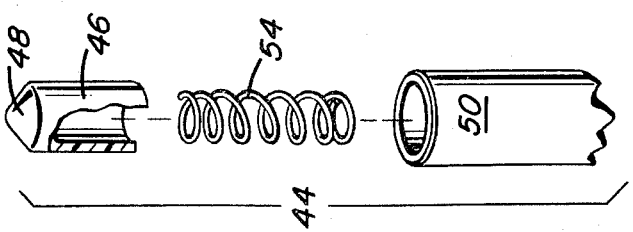
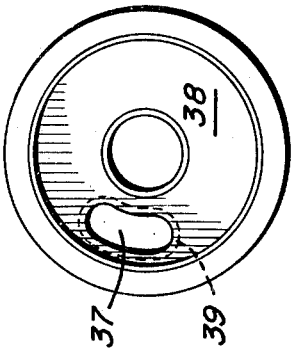

PERSISTENCE TEST APPARATUS

BACKGROUND OF THE INVENTION

Indicative of prior art apparatus are the following U.S. patents: The toy disclosed by Britt (U.S. Pat. No. 2,920,418, issued Jan. 12, 1960) has one, or more, matingly threaded units; the re-assembly unit of Barnabas (U.S. Pat. No. 3,276,149, issued Oct. 4, 1966) discloses the use of indicia in connection with the re-assembly; the Leitner patent (U.S. Pat. No. 3,388,630, issued June 18, 1968) discloses both methods and apparatus for ascertaining a viewer's interest; and, the Harrison patent (U.S. Pat. No. 3,747,589, isssued July 24, 1973) discloses various sensory reaction times for a given subject.

SUMMARY OF THE INVENTION

Among the objects and advantages of my invention are the following:

1. To provide an easy-to-assemble and relatively inexpensive device for presenting a plurality of tasks of successively increasing difficulty to a given subject.

2. To provide means for varying the use of the device to accommodate either left-handed or right-handed subjects.

3. To provide means for varying the rate at which different subjects complete the tasks, yet provide simply evaluated results which are convertible to data that will still make the individual results comparable to a "norm" for a random group of subjects.

4. To provide a structure that is readily manipulated by both an Examiner or observer, and a variety of subjects having widely varying motor capabilities.

5. Provides a flexible research tool in work evaluation training programs to assess such key factors as a person's current potential for work and industry, as evidenced by his average rate of work, his degree of persistence, and his general level of productivity. Specialized research programs could be set up to measure his work tolerance, fatigue, and frustration levels. In subsequent work adjustment training programs, it provides a valuable research tool in which to monitor progress made in the foregoing areas.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side view of my structure with some parts schemically shown.

FIG. 2 is a cross-sectional view, of parts of the device enlarged and taken approximately along the line 2—2 of FIG. 1.

FIG. 3 is an enlarged cross-sectional view of the nut means and related structure, taken approximately along the line 3—3 of FIG. 2.

FIG. 4 is a similarly enlarged cross-sectional view taken approximately along the line 4—4 of FIG. 3 showing the tapered ends of the pins of the inner nut means seated in the notched-out portions of the outer nut means.

FIG. 5 is an exploded view of a single set of one of the pin-spring-sleeve combinations.

FIG. 6 is an obverse view of the smaller half of the split nut, as viewed in FIG. 2, with other parts removed.

DETAILED DESCRIPTION OF THE INVENTION

A base member 10 supports all of the various constituents of my apparatus. Threaded rod 12 is clear of obstructions for the major part of its extent. Rod 12 is supported by standards 14—14 which rotatably receive rod 12, and which in turn are supported by 10. Rotary power source 16 (preferably electric) is flexibly coupled, at 18, to rod 12. A similar flexible coupling member 18 is used at the opposite end of rod 12 to carry the rotation of rod 12 to tachometer 20.

A control panel 22, secured to base 10, carries controls for motor 16. In particular, reference character 24 denotes a safety fuse; 26 represents an on-off switch; 28, an indicia-bearing dial to record the approximate rpm of the output shaft 30 of motor 16. Member 32 represents a clockwise-rotation, neutral, and counter-clockwise-rotation control means, all such portions of the control panel 22 being suitably connected to the motor 16 by suitable wiring, etc. shown schematically at 60.

The split-nut means is generally indicated at 34, with the left-hand (as viewed in FIG. 1) larger part denoted by 36, and the smaller part by 38. 36 and 38 are each centrally threaded to receive threaded rod 12. An Allen-type bolt 40 passes through an arcuately-shaped aperture 37 (flanged at 39 to receive the head of 40), and bolt 40 is threaded into 36 (FIGS 2, 3 and 6) in the threaded aperture 42. This design of 36, 37, 38, 39, and 40 allows a constant and reproducible braking force with very little maintenance or servicing required.

Reference numeral 44—44 indicate generally the pin-spring-sleeve combinations of my device. They are preferably three in number, and each spaced 120° from the other in smooth radial bores in 36. Using FIG. 5, one of the 44 combinations in this exploded view shows a generally hollowed-out cylinder 46, preferably of stainless steel, with a conically-shaped nose 48 at its closed end. A bottom hollowed-out cylinder 50, preferably made of nylon, or similar plastic material and deformable, has an arcuately-shaped bottom wall 52 which mates with the outside diameter curvature of rod 12. Springs 54—54 are received in each of the paired hollowed-out cylinders 46 and 50. The inner periphery of that portion of 38 that overlaps 36 has three V-notches, or conical depressions, 56—56, which receive nose portions 48—48, in one position of use.

When 40 is "loose", 36 and 38 may be manually rotated, approximately 40°, with respect to each other. When 46 and 56 are matingly seated, spring 54 is substantially "relaxed", and thus little or no pressure is applied to rod 12 via the bottoms 52—52. However, when 36 and 38 are rotated with respect to each other, 46—46 are forced out of depressions 56—56, thus compressing springs 54—54. When 40 is tightened, and 54—54 are under compression, they will force 52—52 into pressured engagement with rod 12, making rod 12, with the associated nut means 34 thereon, more difficult for the subject to turn on rod 12, even with the slightly knurled outer surfaces 58—58 on 36 and 38. 62 is a braking washer used during the initial stationary-rod and handspinning the nut means "runs".

Before going into further aspects of its operation and use, the following is given by way of background regarding my device, and the way it is intended to be used.

(Abbreviations used: S = subject; PTA = persistence test apparatus; STA = Stationary time average; RT = rotating trial; TRT = total time spent in rotating trials; and MR = motivational rating.)

A person's degree of motivation for work and industry is an inherent personality characteristic which varies widely from person to person, and is the result of a set of numerous complex variables that developed during growth and development of the individual's personality.

Of all the variables which help determine a person's work motivation, one of the most valid indices of motivation to be productive is the degree of persistence one possesses. This psychological trait, which every individual possesses in varying degrees, is psychologically defined as "maintaining a course of action despite obstacles or opposition." Persistence can also be thought of as "a native capacity for work or energy release". The measurement of an individual's degree of persistence is achieved by isolating the most common factors of the trait and then devising an objective method of measuring these individual factors.

Most researchers have considered "withstanding discomfort to achieve a goal" and "keeping on at a task to achieve a goal, or plodding" to be the two most important factors. There is another factor which seems to be inherently associated with persistence, which I have found in my own research efforts into persistence to be extremely important, and that is "constancy of effort in performance of a task".

A precision AC solid state motor speed control unit is used which accurately varies the rpm of the fractional hp motor from 30 rpm through approximately 2000 rpm.

With 8 inches of travel, the fastest possible time to spin the nut from the left standard or pillow block 14 to the right standard or pillow block 14 would be under 10 seconds. The slowest possible time would be some minutes, but in nearly all cases it would not be expected to be more than 5 minutes. With 20 turns to the inch (SAE 20 fine thread), with 8 inches of travel, this would give 160 turns (revolutions) for the nut's travel along the rod. Therefore for a theoretical extreme upper limit of 6 seconds, the equivalent rpm would be 1600 rpm.

$$\frac{\text{revolutions}}{\text{time in minutes}} = \text{rpm}$$

$$\frac{160 \text{ rev}}{\text{min}} \cdot \frac{60 \text{ sec}}{\text{min}} \cdot \frac{1}{6 \text{ sec}} = 1600 \text{ rpm}$$

$$\frac{160 \text{ rev}}{\text{min}} \cdot \frac{60 \text{ sec}}{\text{min}} \cdot \frac{1}{320 \text{ sec}} = 30 \text{ rpm}$$

The extreme theoretical lower limit would be approximately 320 sec. and the equivalent rpm would be 30 rpm.

The heaviness of the knurl on the nut is an important consideration. The knurl should be light, just enough to prevent slippage of the fingers when light to moderate finger pressure is exerted on the nut. Too heavy a knurl would cause the nut to be spun with only minor physical effort. The knurl should be heavy enough so that a person must apply a steady even pressure of his fingers against the nut in order to spin the nut along the shaft. If too light a finger pressure is used, a good grip cannot be maintained (slippage will occur), and therefore, the nut will not spin as fast. Consequently, a person's time of completion of spinning the nut will be less than on another trial in which he applied more constant effort and finger pressure. This variability of effort from one trial to the next can be easily measured by comparing the times.

In the first part of the test, a S is simply asked to spin a large nut from the side of the left pillow block 14 to the side of the right pillow block 14 on the word "go". This involves using his preferred hand and manually turning over (spinning) the nut anti-clockwise (counter-clockwise) along the stationary threaded shaft with the braking washer jamming the shaft so that it cannot turn. The time required to move the nut from the left hand pillow block to the right one is recorded on a stop watch. Four trials in this manner are given to the individual being tested. Then a time average called the Stationary Trial Average (STA) is calculated from these four times. This figure in seconds can be thought of as a good representation of his average time rate of doing a simple motor task, and realistically assesses how slow or how quickly his average rate of work is. This knowledge is very important in work evaluation programs and is especially useful in work adjustment training programs to assess training efforts designed to increase one's rate of work and productivity.

The second important result of the first part of the test is the measurement of the factor of a person's variability in performance at the spinning task — that is, how constant was he in persisting on the task. As described, the primary function of 44 in the nut means is to provide a braking force which will decrease the nut's momentum, so that when a person's hand is not actually in physical contact with the nut, the resistance force will slow down the forward spin of the nut, and thereby accentuate the periods of time when a person does not consistently apply a steady, even, rhythmic stroke on the nut; or momentarily sloughs off at the job or hesitates. This time "off the task" will be revealed by a longer trial time than on a subsequent trial in which he is more diligent and constant. A corollary function of the nut means is to present a work task which requires a significant expenditure of energy and which is not too easily performed.

The range is the simplest to use, and is simply the longest minus the shortest trial time of the four trials. For example, if 10 seconds was the longest time trial and 6 seconds was the shortest, the range would equal 4 seconds. This would reflect the variability of work performance of the task, and give a quantitative measure of the person's constancy of effort. This factor is a vital ingredient of work performance, and is important in monitoring progress in work adjustment training programs.

In the second part of the test, the rotating trials portion (RT), the factors in persistence of "withstanding discomfort to achieve a goal" and "keeping on at a task to achieve a goal (plodding)" are incorporated.

In the first part of the test, one of the work traits measured was an individual's average rate of work, represented by his stationary time average (STA) for four trials. If an individual is asked to perform a motor task, such as required on the PTA, and accomplishes the task with a certain rate of work, and then is asked to perform the same task under more "discomforting" or "difficult" circumstances, his persistence to continue to work or even work harder at the task is shown by his perserverance.

This factor of additional discomfort or difficulty is created by setting the motor speed control to the rpm which is equivalent to the S's average rate of spinning the nut during the first part of the test. That is, the threaded shaft is rotated backwards at a speed equivalent to the S's natural forward rate of spin, so that in order to move the nut forward along the shaft the S must exert more effort to spin the nut, since the threaded shaft retards the forward motion of the nut continuously. In essence, the S must work harder than before and persevere to accomplish the goal of getting the nut to the other end of the threaded shaft.

The second main factor in persistence, keeping on at a task to achieve a goal is measured simply by the number of RT trials the S accomplishes before he "gives up" and declines to try any more RT. The greater the number of RT completed, the greater the degree of persistence shown. Also indicative of this factor is the total time that a S spends in doing the number of rotating trials he accomplishes before "quitting", known as the total rotating time (TRT), that is, the sum of all the rotating trail times.

TEST INSTRUCTIONS AND PROCEDURES

A. Instructions

1. First part of test; Stationary trials.

"This is a test to see how well you can use your hands. The object of the test is to spin the knob (nut) from the left side of the threaded rod to the right side on the word 'go'. You must place your non-preferred hand behind your back throughout the testing; you can only use your preferred hand (left or right) to spin the knob (nut). You will be given one practice trial before the actual test begins. Do you have any questons?

2. Second part of test; Rotating trials.

"On this portion of the test you are to try to move the knob along the shaft from left to right while the shaft is turning against you. You may have to work harder than before when the shaft was stationary, but it is possible to do the task. Would you like to have a few tries at doing this?" After completion of the first RT, the S may ask if he has to do another one, or he may just ask to go on to the second RT. When the S asks how many trials he is expected to do, the examiner answers, "As many as you wish — when you don't want to do any more trials, just tell me." When the S, for instance, does five RT and then says that he doesn't want to do any more trials, the test is completed.

B. Procedure

The testing procedure of the PTA is a vital part in the actual measurement of persistence, and is closely associated with the electromechanical design of the apparatus itself.

In order to augment the factor of physical discomfort of a S taking the test and also increase the difficulty inherent in the performance of spinning the nut from left to right along the shaft, the S is asked to place his non-preferred arm and hand behind his back, and maintain it in that position throughout the testing period.

The S is asked to take the test standing up, with the PTA placed near the edge of a standard height desk or table. The examiner is seated across the table and operates the motor speed control, reads the tachometer, records the time of the trials, changes the shaft from non-rotating to rotating, and records the data of the test. In order to measure the difficulty and discomfort which is inherent in the performance of spinning the nut from left to right along the shaft, the S is asked to place his non-preferred arm and hand behind his back and hold it there throughout the testing period. With the preferred hand he spins or turns the nut from the left pillow block to the right one on a command to go. One complete trial consists of rotating the knob from the left pillow block to the right one, and the examiner records the time in seconds with a stop watch.

At the end of the four stationary trials, the S is given a few minutes rest, while the examiner calculates his average time rate of turning the nut on the four trials. From precalculated tables, the motor speed control is set at the rpm which represents his average rate of turning the nut on the four trials. The motor is set to rotate clockwise when switched on. The motor is turned on, and on the command go the S spins the knob from left to right along the spinning shaft. This marks the beginning of the RT trials portion of the test.

After completion of each RT the examiner records the time taken to do the trial and the number of the trial.

It is very important that the examiner does not give the S any unnecessary encouragement to do more trials than he might do without encouragement. Comments such as "Well, why don't you try just one more" are contrary to the purpose of a test of persistence. The S is simply told that he may do as many trials as he wishes after the first one, and can quit when he feels he has done enough trials. The number of RT is the number of trials successfully completed before stopping. The S must complete at least one RT for the test to be scored.

Scoring of the PTA

One of the most widely used methods of understanding the relationships between psychological variables is a statistical technique known as correlation. In popular usage, correlation refers to any type of relationship between objects or events. In statistical analysis, however, correlation refers exclusively to a relationship between two variables that can be quantified or objectively measured. There must always be at least a numerical measure for each subject to yield a correlation.

For instance, to take an example from education, we would like to know if and how academic performance in college can be predicted from high school grades. In order to discover what kind of relationship may exist between college success and high school performance, we would compare high school and college grades of randomly chosen sample of students. Using the students' grade point average, we would calculate a coefficient of correlation from an algebraic equation using the students' high school and college GPAs as the two measures being correlated. This coefficient, "$r$", then expresses the degree of relationship between performance in high school and in college. Mathematically, $r$ can range from $+1.00$ to $-1.00$, with $+1.00$ indicating a perfect positive relationship, and $-1.00$ indicating a perfect negative relationship. An $r = 0$ reflects no relationship at all. The $+$ sign of an r means that individuals who score high (or low) on one measure tend to score similarly on the other measure as well. If $r$ is negative, this means that an individual who scores high on one measure tends to score low on the other.

There is another statistical technique that is widely used in psychological research and is simply an extension of $r$ to more than two variables. This technique is called multiple correlation, and is the relationship between one variable (Y) and two or more variables, such as $X_1$ and $X_2$, considered simultaneously.

Still another widely used statistical technique is assessing the relationship between one variable and one or more other variables considered together, and is known as regression. This technique is closely related to multiple correlation, which tells us generally what degree of relationship exists between two or more variables. (Is there a relationship, how close is it, and is it positive or negative?) But regression goes one step further and tells us what "particular" relationship exists between a single individual's score on one measure and his score on another measure. In the case of the previously cited example of high school grades versus college GPA's, regression would permit us to make a prediction regarding an individual college student's predicted GPA based on his high school GPA.

The variable which we are making the prediction from is known as the predictor variable, and the variable which is predicted is called the criterion variable. For example, using these two variables, the criterion variable would be the college grade point average (GPA) and the predictor variable is the student's high school GPA.

The general statistical schema outlined above is utilized to score the PTA. To begin with, the criterion variable is simply a person's overall motivation for work, as evidenced by his persistence. This can be quantified in several ways, but one of the simplest would be the scale shown below, with motivation rated on a scale of 1 to 10, from very low motivation to very high motivation to work. Such a scale would be used by a worker's supervisor to obtain a subjective evaluation of a person's motivation for work.

Motivational Rating Scale

| | |
|---|---|
| Extremely motivated for work | 10 |
| Very highly motivated for work | 9 |
| Highly motivated for work | 8 |
| Moderately motivated for work | 7 |
| Slightly motivated for work | 6 |
| Slightly unmotivated for work | 5 |
| Moderately unmotivated for work | 4 |
| Highly unmotivated for work | 3 |
| Very highly unmotivated for work | 2 |
| Extremely unmotivated for work | 1 |

That is, a person achieving a score of 8 would be considered highly motivated for work (MR = 8). This then is the variable we want to predict, the criterion variable (MR). To do this we must have some predictor variables, to predict one's level of motivation. In the PTA, these predictor variables are used: the number of rotating trials accomplished (RT), the total time spent in the rotating trials portion of the test (TRT), and the degree of variability shown during the stationary trials portion of the test, range or standard deviation, ($ST_{var}$). To summarize, there are three variables used to predict the criterion variable, motivational rating, and these predictor variables are RT, TRT, and variability of ST.

To take a hypothetical example, let us suppose a small sample of 100 factory workers have taken the PTA and have been subjectively rated on MR by management. We are interested in using the PTA data derived from this sample to predict a new factory applicant's MR based on his scores on $ST_{var}$, RT, and TRT. From each of the 100 workers we have their scores on each of the three predictor variables. In order to ascertain the degree of validity these predictor variables possess in the sample, we calculate coefficients of correlation with MR using the predictor variables scores, and this, for example yields the following results:

| Criterion variable | Coefficients of Correlation "r" | Predictor variables | |
|---|---|---|---|
| MR | $ST_{var}$ | RT | TRT |
| r | $r_1$ | $r_2$ | $r_3$ | where $r_1$, $r_2$, and $r_3$ are actual numerical values. Using these individual r's of $r_1$, $r_2$, and $r_3$, we then can calculate a "R" or coefficient of multiple correlation of three variables ($R_{123}$).

Let us say for illustrative purposes that from the 100 workers' data an $R_{123}$ of 0.60 was yielded. Such an $R_{123}$ = 0.60 would probably indicate a moderately high degree of relationship of the three predictor variables $ST_{var}$, RT and TRT when they were considered as operating "collectively or together" to predict MR. If this $R_{123} = 0.60$ was statistically significant for this sample, then this coefficient can also be known as a coefficient of predictive validity. In most pyschological and educational circles a coefficient of predictive validity as low as 0.45 is considered by many to be the lowest predictive validity coefficient for a test of practical usefulness.

Once we have determined the predictive vaidity of the predictor variables using multiple correlation, we can then feel confident if it is high enough, to use the multiple regression technique using the 100 factory workers' individual scores on $ST_{var}$, RT, and TRT, and MR to predict a new factory applicant's MR score based on his $ST_{var}$, RT and TRT scores. The multiple regression equation for three variables is given by:

$$Y = a + b_1X_1 + b_2X_2 + b_3X_3 \tag{1}$$

where $Y$ is the criterion variable (predicted MR score of the new applicant), $a$ is a constant, $b_1$, $b_2$, and $b_3$ are regression coefficients for each of the predictor variables, and $X_1$, $X_2$, and $X_3$ are the predictor variables themselves ($X_1 = ST_{var}$ score, $X_2 = $ RT score, $X_3 = $ TRT score¼.

In order to substitute a new factory applicant's scores on $X_1$, $X_2$, and $X_3$ into the equation to yield a value of $Y$, the predicted MR for him, we need to compute the values of $a$, $b_1$, $b_2$, and $b_3$ from the data of the sample of 100 factory workers, where the $X_1$, $X_2$, and $X_3$ are known for each worker, and the $Y$ was subjectively evaluated by management, also for each worker. This is accomplished by solving the following set of simultaneous linear equations, which will yield values of $a$, $b_1$, $b_2$, and $b_3$.

$$\Sigma x_1 Y = b_1 \Sigma X_1^2 + b_2 \Sigma X_1 X_2 + b_3 \Sigma X_1 X_3 + a \Sigma X_1$$

$$\Sigma X_2 Y = b_1 \Sigma X_1 X_2 + b_2 \Sigma X_2^2 + b_3 \Sigma X_2 X_3 + a \Sigma X_2$$

$$\Sigma X_3 Y = b_1 \Sigma X_1 X_3 + b_2 \Sigma X_2 X_3 + b_3 \Sigma X_3^2 + a \Sigma X_3$$

$$\Sigma Y = b_1 \Sigma X_1 + b_2 \Sigma X_2 + b_3 \Sigma X_3 + an \tag{2}$$

where $\Sigma$ means "the total sum of", and $n$ is the number in the sample.

Once values of $b_1$, $b_2$, $b_3$, and $a$ are determined from these equations, they are substituted into equation (1) $Y = a + b_1X_1 + b_2X_2 + b_3X_3$. Then for individual scores of a new applicant on the $X_1$, $X_2$, and $X_3$ scores, a predicted $Y$ (motivational Rating) is given. That is, using this regression sample, a new factory applicant's MR score could be predicted using the regression sample data which gave $a$, $b_1$, $b_2$, and $b_3$, and the applicant's $X_1$, $X_2$ and $X_3$ scores obtained from the PTA.

The above schema requires that the PTA be given to an initial sample of individuals before a given person can be scored on the level of motivation for work that he possesses. As the PTA comes into use, the test results from much larger and varied groups will become available, and these regression samples will become the established norms to predict MR for many different groups of people. Eventually norms can be established for factory workers, students, businessmen, etc. covering a wide variety of occupations, as well as norms for the general population.

In a given test run on an individual subject, operation would be as follows, after giving the necessary instructions to the subject With the brake means 62 set to keep rod 12 stationary, the observer runs 34 to one side or the other, depending upon the preference of the individual subject. The subject makes his four timed "runs" with the rod 12 stationary. Taking the lowest (fastest) time, or the average time, depending upon how the parameters are determined, the observer then sets the required rpm on 22, for rotation in the direction determined by 32; and the subject starts his (more difficult) runs with rod 12 rotating. When more "effort" on the part of the subject is to be ascertained, in either the stationary run, or the "rotating" run, 36 and 38 are normally rotated with respect to each other, the Allen bolt is re-set to apply more, or less, pressure on the threaded rod 12, via the FIG. 5 combinations, to get additional "time" figures for the same (stationary or rotary) run, but requiring more effort on the part of the subject.

Obviously once a given set of parameters are ascertained, these same parameters must be uniformly applied to all subjects in a given group of subjects where comparisons with "norms", or with other subjects within the same group are desired.

My PTA

1. Evaluates one's overall degree of persistence by the actual measurement of three key factors in persistence:
   a. Withstanding discomfort to achieve a goal.
   b. Keeping on at a task to achieve a goal. (Plodding)
   c. Constancy of effort in performance of a task.

2. Estimates a person's natural rhythm and pace of work based on his average rate of work performance on the PTA.

3. Assesses a person's overall degree of motivation for work and industry by quantifying one of the most accepted indicies of work motivation—one's degree of persistence.

4. With the evaluation of a person's degree of persistence, coupled with his average rate of work performance, as both are measured on the PTA, an estimate can be made of a person's general level of productivity.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for testing the persistence of an individual subject including a threaded rod, spaced supports for said rod, nut means movable along the portion of the length of said threaded rod between said spaced supports, power means connected to one end of said threaded rod, means for controlling the speed and direction of rotation of said threaded rod, and a tachometer connected to the end of said threaded rod opposite to said power means.

2. The apparatus of claim 1 wherein a control panel including an on-off switch, a fuse, a clockwise rotation-off-counterclockwise rotation direction switch, and a calibrated scale for setting the rpm of an output shaft of said power source mounted thereon.

3. The apparatus of claim 2 wherein the tachometer has a range of approximately 30 rpm to 2000 rpm.

4. The apparatus of claim 1 wherein the nut means includes a "split" nut having an internally threaded bore in each part thereof, each part being relatively rotatable with respect to the other part to regulate a braking or "drag" means located internally of one of the two parts.

5. The apparatus of claim 4 wherein a deformable sleeve member bears against said threaded rod to provide (a) a braking means when the split nut portions are in one angular relationship, and (b) when the nut portions are in a second angular position with respect to each other, the braking effect is released and no drag is present on the threaded rod.

6. The apparatus of claim 5 wherein additional fastening means secure the split nut parts in each of their two positions.

7. The apparatus of claim 6 wherein there are three deformable sleeves, one in each of three smooth-reamed holes, spaced 120° apart radially of the axis of the nut means, held in place by three springs, and three short tips each having a conically-shaped nose portion, and each mates with a corresponding V-notch or conical depression in the internal periphery of the other split nut part.

8. The apparatus of claim 6 wherein the additional fastening means is an Allen bolt to lock the two split nut parts in each of their two positions.

9. A method of operating the apparatus of claim 8 including the steps of:
   a. instructing the subject as to the parameters of each run;
   b. timing the subject on each of his runs;
   c. setting the appropriate speed of rotation of the threaded rod based on the times in (b);
   d. timing further runs; and
   e. setting the Allen bolt in the nut means to require further effort on the part of the subject.

10. Apparatus for testing the persistence of an individual subject including a threaded rod, nut means movable along a fixed portion of the length of said rod, said portion of rod being limited by standards supporting the rod, power means connected to one end of said threaded rod, means for controlling the speed and direction of rotation of said threaded rod, a tachometer connected to the end of said threaded rod opposite to said power means, and measurement means integral with the power means and the tachometer means, whereby the speed and direction of said threaded rod is measured and controlled.

* * * * *